US010994348B2

(12) United States Patent
Albè et al.

(10) Patent No.: US 10,994,348 B2
(45) Date of Patent: May 4, 2021

(54) SYSTEM AND METHOD FOR CUTTING TO LENGTH LONG ROLLED PRODUCTS COMING FROM DIFFERENT STRANDS OF A ROLLING MILL

(71) Applicant: PRIMETALS TECHNOLOGIES AUSTRIA GMBH, Linz (AT)

(72) Inventors: Roberto Albè, Gorla Minore (IT); Roberto Bianchi, Milan (IT); Ezio Colombo, Milan (IT)

(73) Assignee: PRIMETALS TECHNOLOGIES AUSTRIA GMBH

( * ) Notice: Subject to any disclaimer, the term of this patent is extended or adjusted under 35 U.S.C. 154(b) by 94 days.

(21) Appl. No.: 14/902,988

(22) PCT Filed: Jun. 26, 2014

(86) PCT No.: PCT/EP2014/063486
§ 371 (c)(1),
(2) Date: Jan. 5, 2016

(87) PCT Pub. No.: WO2015/000779
PCT Pub. Date: Jan. 8, 2015

(65) Prior Publication Data
US 2016/0151815 A1 Jun. 2, 2016

(30) Foreign Application Priority Data
Jul. 5, 2013 (EP) ..................... 13425096

(51) Int. Cl.
*B21B 15/00* (2006.01)
*B21B 1/16* (2006.01)
(Continued)

(52) U.S. Cl.
CPC .......... *B23D 33/02* (2013.01); *B21B 15/0007* (2013.01); *B23D 25/12* (2013.01);
(Continued)

(58) Field of Classification Search
CPC ............. Y10T 83/4714; Y10T 83/4717; Y10T 83/4711; Y10T 83/4708; B21B 15/0007; B21B 1/16; B21B 2015/0014
(Continued)

(56) References Cited

U.S. PATENT DOCUMENTS 2,126,528 A * 8/1938 Beach .................... B21C 47/143
242/361.1
2,234,976 A * 3/1941 Muntwyler ............. B21F 11/00
83/306
(Continued)

FOREIGN PATENT DOCUMENTS

CH 698 243 B1 6/2009
CN 1215640 A 5/1999
(Continued)

OTHER PUBLICATIONS

First Office Action dated Jul. 26, 2016 and Search Report in corresponding Chinese Patent Application No. 201480038243.2 (English language translation)(16 total pages).
(Continued)

*Primary Examiner* — Laura M Lee
(74) *Attorney, Agent, or Firm* — Ostrolenk Faber LLP

(57) ABSTRACT

A system for cutting to length at least two strands of long rolled products (3, 5) preferably coming from a hot rolling mill. The system includes shears comprising at least two rotatable drums (4,6), each drum having a cutter (8,8',10, 10') arranged to cut simultaneously at least two strands of long rolled products into finished segments. The system further includes at least two movable guides (12,14), each including at least two channels, each guide arranged to receive and guide at least one strand (3,5) of long product. The guides are movable between a position wherein, in operation, the strands of long product are located in positions either outside of the trajectory of the cutters in a
(Continued)

position wherein the strands cannot be cut or wherein the strands are located on the trajectories of the cutters and can be cut by the cutters.

11 Claims, 3 Drawing Sheets

(51) Int. Cl.
  B23D 33/02 (2006.01)
  B23D 25/12 (2006.01)
(52) U.S. Cl.
  CPC ......... *B21B 1/16* (2013.01); *B21B 2015/0014* (2013.01); *Y10T 83/2083* (2015.04); *Y10T 83/4705* (2015.04); *Y10T 83/4714* (2015.04)
(58) Field of Classification Search
  USPC ............ 83/105, 106, 305, 306, 307; 72/203
  See application file for complete search history.

(56) References Cited

U.S. PATENT DOCUMENTS

| | | | | |
|---|---|---|---|---|
| 2,414,772 | A * | 1/1947 | Sheperdson | B23D 25/12 83/106 |
| 2,701,016 | A * | 2/1955 | Bedson | B23D 33/02 83/105 |
| 2,924,136 | A * | 2/1960 | Peterson | B23D 25/12 83/306 |
| 3,760,670 | A * | 9/1973 | Poran | B23D 25/00 83/102 |
| 3,811,354 | A * | 5/1974 | Ito | B23D 36/0058 83/320 |
| 3,834,260 | A * | 9/1974 | Sieurin | B21B 39/18 83/106 |
| 4,062,259 | A * | 12/1977 | Sclippa | B23D 25/12 83/285 |
| 4,392,399 | A * | 7/1983 | Wyzgol | B23D 25/12 83/106 |
| 4,406,198 | A * | 9/1983 | Pechau | B23D 25/12 83/170 |
| 4,627,320 | A * | 12/1986 | Fuccaro | B23D 31/04 83/163 |
| 4,966,060 | A * | 10/1990 | Poloni | B21B 39/18 83/105 |
| 4,977,806 | A * | 12/1990 | Poloni | B23D 31/001 83/105 |
| 5,040,440 | A * | 8/1991 | Harvey | B21B 39/18 209/657 |
| 5,526,726 | A * | 6/1996 | Shore | B23D 25/00 83/105 |
| 5,857,370 | A * | 1/1999 | Grenz | B21B 15/0007 72/203 |
| 6,070,510 | A * | 6/2000 | Poloni | B23D 25/12 83/105 |
| 6,082,237 | A * | 7/2000 | Bollig | B23D 33/02 83/105 |
| 6,684,745 | B2 * | 2/2004 | Shen | B23D 25/12 83/105 |
| 6,745,656 | B1 | 6/2004 | Shen et al. | |
| 7,107,891 | B2 | 9/2006 | Kneppe et al. | |
| 9,278,456 | B2 * | 3/2016 | Shen | B26D 1/01 |
| 9,950,357 | B2 * | 4/2018 | De Luca | B21D 43/282 |
| 2002/0073816 | A1 * | 6/2002 | Panzer | B21C 47/34 83/37 |
| 2002/0092391 | A1 * | 7/2002 | Shen | B23D 25/12 83/105 |
| 2005/0235721 | A1 | 10/2005 | Shore | |
| 2012/0198978 | A1 * | 8/2012 | Shen | B23D 33/02 83/78 |
| 2015/0343515 | A1 * | 12/2015 | De Luca | B23D 33/02 83/23 |

FOREIGN PATENT DOCUMENTS

| | | |
|---|---|---|
| CN | 1297793 A | 6/2001 |
| DE | 3725886 A1 | 9/1988 |
| DE | 41 01 941 A1 | 7/1992 |
| EP | 0796692 A1 | 9/1997 |
| JP | S 53-105780 | 9/1978 |
| JP | S 55-11778 | 1/1980 |
| JP | S 62-199314 | 9/1987 |
| JP | H 6-9816 | 2/1994 |
| JP | H 7-124814 | 5/1995 |
| SU | 740418 | 6/1980 |
| SU | 1407704 A1 | 7/1988 |
| SU | 656265 A | 7/1989 |

OTHER PUBLICATIONS

International Search Report dated Oct. 22, 2014 issued in corresponding International patent application No. PCT/EP2014/063486.
Written Opinion dated Oct. 22, 2014 issued in corresponding International patent application No. PCT/EP2014/063486.
Office Action dated Jan. 30, 2017 issued in corresponding Japanese Patent Application No. 2016-522491 with English translation.
European Notice of Opposition, dated Jun. 6, 2018, issued in corresponding European Patent Application No. EP13425096.8 / European Patent No. EP2821153. Total 15 pages.
Russian Notice of Allowance dated Mar. 29, 2018 issued in corresponding Russian Patent Application No. 2016103621/02(005651) with English translation.

* cited by examiner

000
SYSTEM AND METHOD FOR CUTTING TO LENGTH LONG ROLLED PRODUCTS COMING FROM DIFFERENT STRANDS OF A ROLLING MILL

CROSS-REFERENCE TO RELATED APPLICATIONS

The present application is a 35 U.S.C. §§ 371 national phase conversion of PCT/EP2014/063486, filed Jun. 26, 2014, which claims priority of European Patent Application No. 13425096.8, filed Jul. 5, 2013, the contents of which are incorporated by reference herein. The PCT International Application was published in the English language.

BACKGROUND OF THE INVENTION

The invention concerns a system for cutting to commercial length ferrous long rolled products coming from different strands of a rolling mill.

The invention may be used particularly, but not exclusively, in hot-rolling plants for the production of ferrous long products such as bars, rods or the like.

In order to produce finished long metal products such as bar, rod or the like, a plant comprises, among other devices, a plurality of rolling stands aligned along a rolling line to continuously roll billets received from a furnace or other like source.

A long product production plant can be configured to process simultaneously a plurality of strands. The strands are obtained by dividing or slitting the product when it is still hot at a given point of the plant, for example after a given number of rolling passes. The slitting is to increase the production rate of a plant without increasing the rolling speed of the last stands. After this slitting, the long metal product is divided in different strands which need to be subsequently treated.

After the last rolling stand, the product is generally cut into bar segments, which are subsequently cooled, for example in a cooling bed.

Therefore, there is a need for a simple, compact and efficient cutting means able to cut a plurality of strands coming from a rolling mill before their discharge onto a cooling bed.

SUMMARY OF THE INVENTION

The above mentioned problems are solved by a system for cutting to length at least two strands of long rolled products preferably coming from a hot rolling mill[.] The system comprises:

a shear comprising at least two rotatable drums, each drums having cutting means arranged to simultaneously cut at least two strands of long rolled products into finished segments, at least two movable guides, each guide comprising at least two channels, each channel being arranged to receive and guide at least one strand of long product[:] the guides are movable between a position wherein, in operation, the at least two strands of long products are located outside of the trajectory of the cutting means in a position at which the strands cannot be cut, and a position at which the at least two strands are located on the trajectory of the cutting means and can be cut by the cutting means.

According to other features of the invention, taken alone or in combination:

each drum comprises at least two knives spaced apart from each other and extending outwardly from an external wall of the drum;

the knives of a drum have substantially circular trajectories, each trajectory is contained in parallel vertical planes;

at least one knife of each drum is located such that its circular trajectory is contained in one vertical plane;

each drum comprises one knife, each knife has two cutting surfaces and has a "U" shape defining a passage for one or more strands;

the guides are rotatable between two positions;

each guide comprises a spacer extending between each channel and horizontally spacing apart each channel relative to the other channel of the guide;

each drum has a substantially cylindrical shape with an axis, each axis is located in the same vertical plane and extends in a parallel manner one relative to the other;

the knives of each drum are aligned on a line parallel to the axis of said drum;

The system comprises a plurality of driving means, each connected to a connector of a guide and each driving mean comprising a crank and connecting rod assembly intended to cyclically translate each corresponding guide in two directions.

each guide further comprises a shaft connected to the two channels, wherein the translation provokes rotation of each guide about the shaft between said two positions;

a first guide is located upstream the of shear and a second guide is located downstream the of shear in the travel direction of the strands.

The invention also concerns a method of cutting to length at least two strands of long rolled products into finished segments , said at least two strands preferably coming from a hot rolling mill[.] The method comprises:

continuously moving the two strands forward, simultaneously guiding the at least two strands within the trajectory of cutting means able to simultaneously cut the at least two strands , simultaneously cutting the at least two strands with the cutting means, simultaneously guiding the at least two strands outside the trajectory of the cutting means.

Advantageously the guiding steps comprise simultaneously rotating the two strands.

The invention provides a system for cutting to length long rolled products coming from different strands of a rolling mill simultaneously and in a simple manner and also minimizing the space needed to process multiple strands in a rolling mill plant.

BRIEF DESCRIPTION OF THE DRAWINGS

The teachings of the present invention can be readily understood by considering the following non-limiting detailed description in conjunction with the accompanying drawings, in which.

DETAILED DESCRIPTION OF THE INVENTION

Figure 1:
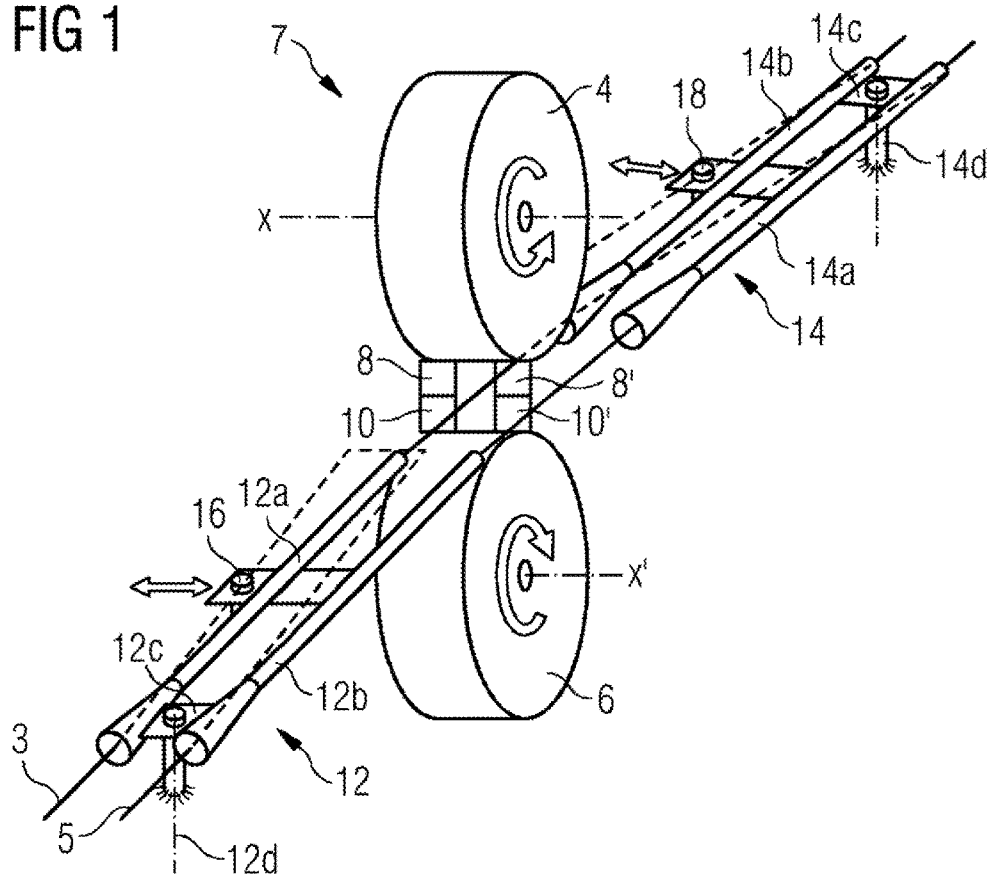
FIG. 1 is a schematic view of a cutting system according to the invention.
Figure 2:
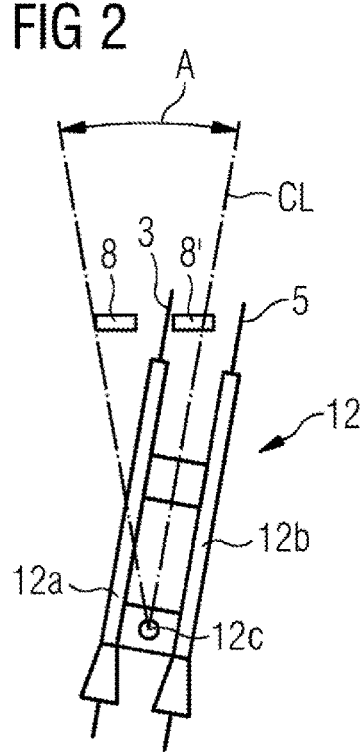
FIG. 2 is a schematic top view of a guide used in the cutting system shown in FIG. 1.

In the embodiment of FIGS. 1 and 2, the system for cutting to length long rolled products according to the invention comprises an upper drum 4 and a lower 6 drum. Each drum 4 or 6 has a substantially cylindrical shape with a respective axis X or X' and each supports cutting means arranged to cut simultaneously two strands of long products coming from a rolling mill or from another source into finished segments. The axes X and X' are located in the same vertical plane and extend parallel within the plane.

Figure 3:
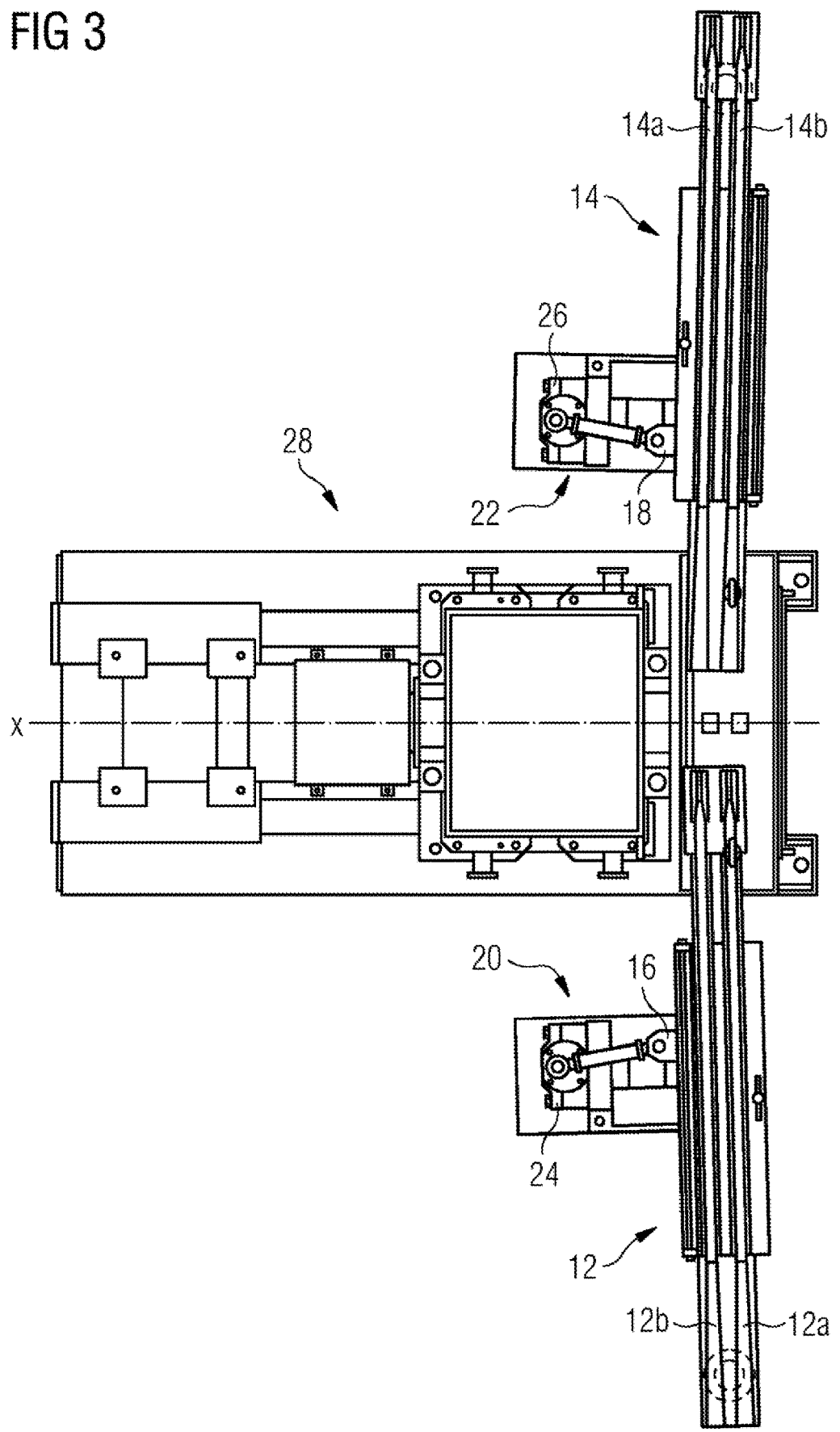
FIG. 3 is a longitudinal cross section of a possible embodiment of the invention.

As shown in the FIGS. 1-3, the cutting means may be knives supported by the drums 4 and 6. Each knife extends radially outwardly from the external wall of its respective drum 4 or 6. In this embodiment, each drum 4 or 6 supports a pair of upper knives 8, 8' or a pair of lower knives 10,10', respectively. Within each pair, the knives are axially aligned and axially spaced apart one relative to the other[.] The distance between the knives depends on the distance between the two strands of products. In other words each upper knife 8 and 8' is at least partially located in a plane passing through the axis X of its drum 12 and each lower knife 10 and 10' is at least partially located in a plane passing through the axis X' of its drum 14. Furthermore, lower and upper knives are horizontally spaced apart within their planes. Again, the knives of each drum 8/8' or 10/10' are aligned parallel to the axis of the drum and are spaced apart on this line.

The pairs of knives 8/8' and 10/10' rotate with their respective drum and are positioned such that two sections from two strands are simultaneously cut. Each upper knife 8, 8' cooperates with a respective lower knife 10 or 10' to cut a strand of long product into finished segments. In the embodiment shown in the Figures, an upper knife 8 and a lower knife 10, called here left knives, which are intended to cut one strand of long product, are located at least partially in a first radial plane relative to the axes X,X'. In the same manner, the other upper knife 8' and lower knife 10', called here right knives, are located at least partially in a second radial plane relative to the axes X,X'.

The right and left knives are located to overlap when they reach a point where their circular trajectories are closer (for example the lower point for the upper knives 8,8' and the upper point for the lower knives 10,10') in order to cut the strand 3 and 5 of long product in finished segments of rolled long product.

Drums 4 and 6 are connected to one or a plurality of driving mean(s) (not shown) which rotate(s) both drums at the same peripheral speed regardless of drum diameter. As shown on FIG. 3, the driving means may comprise a gearbox/motor assembly 28.

The system also comprises at least two rotatable guides 12 and 14. Each guide comprises two channels[.] Each channel is configured, intended and arranged to receive and to guide one strand of long product. As can be seen in all the Figures, an entry guide 12 extend horizontally upstream of the shear 7 in the direction of travel of the product and an exit guide 14 extends horizontally downstream of the shear 7.

The channels 12a/12b or 14a/14b of a respective guide 12 or 14 may be spaced apart and linked together by means of at least one spacer 12c or 14c. A rotation rod (or shaft) 12d or 14d extends vertically down from each of the spacers 12c or 14c. Each channel 12a or 12b may comprise an entry section having a conical shape[.] The entry section leads to an exit section having a constant cross-section intended to maintain each strand in the correct position before and after the shearing.

Guides 12 and 14 are spaced apart by a distance sufficient for the knives to cooperate to cut the respective strands and at the same time to allow a correct guiding of the strands and of the segment of strands before and after cutting.

As seen in FIG. 3, driving means can be provided to rotate the corresponding guide about each rod 12d or 14d. The driving means can be connected to a connector 16 or 18 located on the side of each guide 12, 14. In the embodiment shown, each driving means comprises a crank and a connecting rod assembly 20 or 22 which is driven by a motor 24 or 26. Each assembly comprising driving means and a guide forms a four bars linkage system.

Each assembly 20, 22 when activated cyclically translates its corresponding guide 12 or 14 forward and backward. The guides 12 and 14 are in turn rotated about their shaft 12d or 14d, between a non cutting position wherein, in operation, the strands of long products 3 or 5 are located outside of the trajectory of the cutting means in a position wherein the strands cannot be cut and, a cutting position wherein the two strands 3 and 5 are located on the trajectory of the cutting means 8, 8' and 10, 10' where the strands can be cut by the cutting means into segments of long product. FIGS. 1 and 2 show a configuration where the strands 3 and 5 are outside the cutting trajectory. The travel range of a guide 12 or 14 is materialized in FIG. 2 by the double arrow A.

To cut both strands 3 and 5 into finished segments, drums 4 and 6 are continuously rotated, in opposite directions. It has to be noted that the two strands of product are continuously moved forward by pinch rolls (not shown) located upstream and/or downstream of the system according to the invention.

In the embodiment shown in FIG. 2 the driving means of the guides are controlled, in a first step, such that in a non-cutting position the two strands are outside of the trajectory of the cutting means with one strand 3 located between the left cutting means 8 and the other strand 5 located on the right side of the right cutting means 8'. Subsequently, in a second step, both strands are rotated (to the left) to be positioned within the trajectory of the cutting means and are there cut into segments of long product. Subsequently, in a third step, both strands are further rotated to the left such that both strands 3 and 5 are again located outside the trajectory of the cutting means. Here, the left strand 3 is located on the left side of the left cutting means 8 and the right strand 5 is located between the two cutting means. Thereafter, in a fourth step, both strands are driven back into the trajectory of the cutting means and are again cut into segments of long product. The cycle is then repeated from the first step.

These motions are illustrated by the double arrow labeled A which shows the travel of the center line CL of the guide 12.

In another embodiment, in a first step, guides 12 and 14, each fed with rolled long products by an upstream pinch roll, are driven to position each strand 3 and 5 on the circular trajectory of the right 8'/10' and left 8/10 pair of knives. Therefore, at the end of this rotation each strand 3 and 5 is respectively located between the knives 8/10 and 8'/10' of the left and right pair of knives.

This motion of the guides is illustrated for example by the double arrow labeled A on FIG. 2.

Further rotation of the drums 4 and 6 causes an overlapping of the knives 8'/10' forming the right pair of knives and also provokes and overlapping of the knives 8/10 forming the left pair of knives and provokes cutting of both strands 3 and 5 simultaneously.

Subsequently, in a second step, each guide 12 or 14 is rotated into a position where the strands 3 and 4 are located outside the circular trajectory of the knives. For example, and as seen on FIG. 2 which shows a top view of FIG. 1 wherein only knives 8, 8' or 10, 10' are represented, the strand guides are rotated in clockwise direction until a point where strand 3 is located between knives 8 and 8' (respectively 10, 10') whereas the strand 5 is located on the left hand side of the knives 8' and 10'.

As above described, the motion of each strand 3 and 5 is limited to the minimum needed to displace each strand from a position where each strand is outside the trajectory of two cutting means to a position where each strand intercepts the trajectory of the two cutting means. For this purpose, the free space between the left and the right knives can be used to position either of strand 3 or strand 5 outside of the cutting trajectories.

This also allows the simultaneous cutting of both strands, which simplifies the subsequent handling of the segments.

Subsequently second and third steps are repeated such that pluralities of segments are cut to length from both strands simultaneously.

Control means (not shown) synchronize the different driving elements of the system according to the invention such that to operate the cut of each strand of long product, for example, by controlling the speeds of the motors 24 and 26, the speed of the motor part of gearbox/motor assembly 28, and the speed of the strands of long products via the speed of the driving pinch rolls. The position of the knives can also be provided to the control means by appropriate sensors, in order to realize the position regulation. The control means also control the above mentioned parameters to obtain the desire length of the long product segments.

It has also to be noted that the driving means can be driven such that both strands of the long product travel cyclically from the right side of the cutting means until the left side of the cutting means. This can be for example the case in an embodiment wherein only one knife is provided per drum for cutting a plurality of strands of long products.

Figure 4:
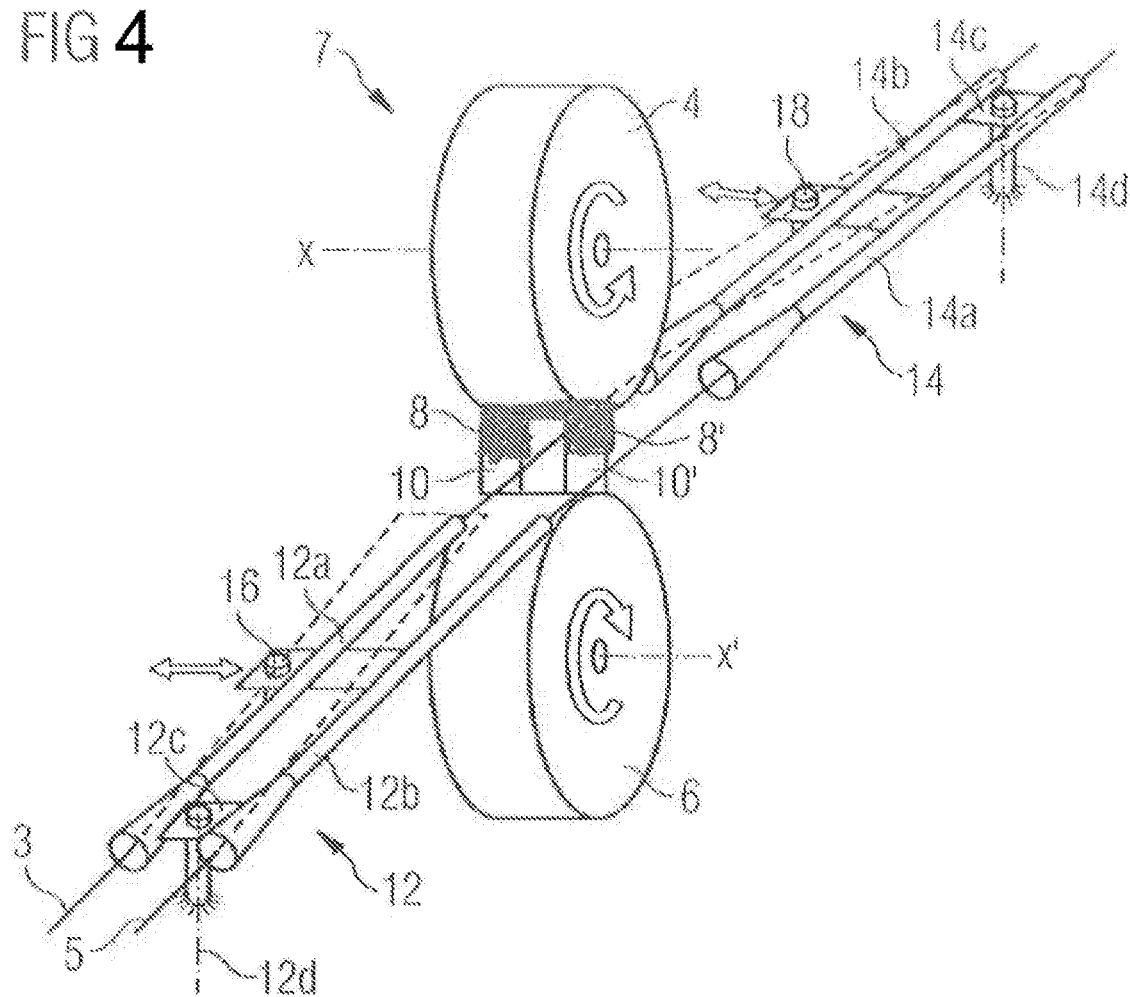
FIG. 4 is a schematic view of an alternate embodiment of the cutting system shown in FIG. 1.

In another embodiment as shown in FIG. 4, each drum comprises only one knife, each knife having two cutting surfaces and having a "U" shape defining a passageway for one or more of the strands. In this embodiment, each knife may comprise two ends similar to the knives 8, 8' and 10, 10' respectively, said ends being connected together with a horizontal portion of extending therebetween. In this embodiment the upper knife 8, 8' has an inverted "U" shape, whereas the lower knife 10, 10' has a "U" shape.

As above shown, the invention provides an efficient and compact mean to simultaneously cut a plurality of strands coming from a hot rolling mill.

The invention claimed is:

1. A system for cutting to length first and second strands of long rolled products coming from a rolling mill, the system comprising:
   a shear comprising at least two rotatable drums, each drum having a cutting device including a knife, the at least two cutting devices being arranged to simultaneously cut the first and second strands of the long rolled products as they pass the drums, into finished segments;
   a first moveable strand guide comprising at least two first channels followed by at least two second channels in a second movable strand guide and a space separating an outlet of each of the first channels from a respective inlet of each of the second channels, each of the first channels of the first strand guide communicating with a respective second channel of the second strand guide;
   each first channel being configured to receive and guide one of the first and second strands of the long rolled products from an inlet of the first channel through the outlet of the first channel, into the inlet of the second channel through an outlet of the second channel;
   the first and second strand guides being pivotable between a non-cutting position at which the first and second strands are not cut and a cutting position at which the first and second strands are cut, wherein during operation of the system, the first and second strands of long products pass along the first and second guides outside of a trajectory passing the cutting devices in non-cutting positions at which the strands are not cut and when the first and second guides are pivoted into cutting positions, the first and second strands are located on trajectories passing the cutting devices where the strands are cut by the cutting devices; and
   wherein means for pivoting the first and second guide strands are configured to selectively pivot the first and second strand guides between a first and a second non-cutting position;
   in the first non-cutting position, the first and the second strands are both outside of the respective trajectories of the first and second cutting devices, wherein the first strand is between the first and the second cutting devices and the second strand is outside the first cutting device and not between the first and second cutting devices; and
   in the second non-cutting position, the first and second strands are also both outside of the respective trajectories of the first and the second cutting device, wherein the second strand is between the first and the second cutting devices and the first strand is outside the second cutting device and not between the first and second cutting devices; and
   the first and the second movable strand guides pivot the first and the second strands in a first direction from the first non-cutting position to the second non-cutting position and pivot the first and the second strands in a second direction from the second non-cutting position to the first non-cutting position, where the first direction is opposite the second direction, and wherein the pivoting of the guides between the first and second non-cutting positions places the first and second strands along the trajectories passing the cutting devices to cut the first and second strands of the rolled product.

2. A system according to claim 1, wherein the cutting device of each drum comprises a knife for cutting a respective one of the at least two strands at each drum.

3. A system according to claim 2, wherein the respective knife of each drum has a substantially circular trajectory when rotating with the respective drum, and the knife trajectories are contained in parallel vertical planes.

4. A system according to claim 3, wherein at least one knife of each drum is located such that its circular trajectory is contained in one vertical plane.

5. A system according to claim 1, wherein the first and second guides are supported to be pivotable between the cutting and the non-cutting positions thereof.

6. A system according to claim 1, wherein the first and second guides comprise a spacer extending between the neighboring channels of the respective guide and the spacer horizontally spacing apart each channel relative to the other neighboring channel of the respective guide.

7. A system according to claim 1, wherein each of the at least two drums has a respective axis, and the axes of the drums are located in the same vertical plane and extend parallel to one another.

8. A system according to claim 7, wherein the knife of each drum is aligned on a line parallel to the axis of the drum.

9. A system according to claim 1, wherein the means for pivoting comprises a plurality of pivoting devices, each connected to a respective connector of a guide, each pivoting device comprising a crank and a connecting rod assembly connected to the respective guide and is configured to cyclically translate each corresponding guide in directions between the cutting position and each of the first and second non-cutting position.

10. A system according to claim 1, wherein the first and second strands are supported strands are supported to run spaced apart past the strand guides; the strand guides are located both prior to and after the cutting devices, whereby the strands pass the cutting devices and when the strands are cut, the cut parts of the strands pass the strand guides located after the cutting devices after the strands are cut.

11. A system according to claim 1, wherein the cutting devices on each of the at least two drums are spaced apart leaving a space between the at least two drums and between the cutting devices.

\* \* \* \* \*